(No Model.)

C. W. HUNT.
CONVEYER FOR COKE.

No. 438,376. Patented Oct. 14, 1890.

Witnesses:
J. Staib
Chas H. Smith

Inventor:
Charles W. Hunt
per Lemuel W. Serrell
Atty

United States Patent Office.

CHARLES W. HUNT, OF WEST NEW BRIGHTON, ASSIGNOR TO THE C. W. HUNT COMPANY, OF NEW YORK, N. Y.

CONVEYER FOR COKE.

SPECIFICATION forming part of Letters Patent No. 438,376, dated October 14, 1890.

Application filed January 22, 1890. Serial No. 337,743. (No model.)

*To all whom it may concern:*

Be it known that I, CHARLES W. HUNT, a citizen of the United States, residing at West New Brighton, in the county of Richmond and State of New York, have invented an Improvement in Conveyers for Coke, Ore, &c., of which the following is a specification.

In the manufacturing of illuminating-gas the coke is usually raked out from the retort and falls into a hopper beneath the mouth of the retort, and from this hopper the incandescent coke passes into the trough-shaped conveyer, in which are traveling scrapers that move the material along to the point of delivery. This apparatus is also adapted to and sometimes used with calcining or roasting furnaces for the reception of the hot mineral substances and for conveying the same to a point of delivery. In practice, however, it is found that the heated materials within the conveyer-trough rapidly injure such trough and the scrapers or conveyers, especially at those places where the mineral substances in the highly-heated condition pass from the hopper into the conveyer-trough.

My present invention is for the twofold object of preventing injury to the conveyer-trough and for cooling the material while within such trough as it is moved along to the point of delivery.

Figure 1:
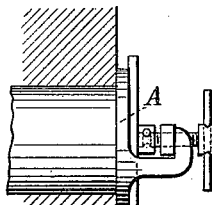
Figure 1:
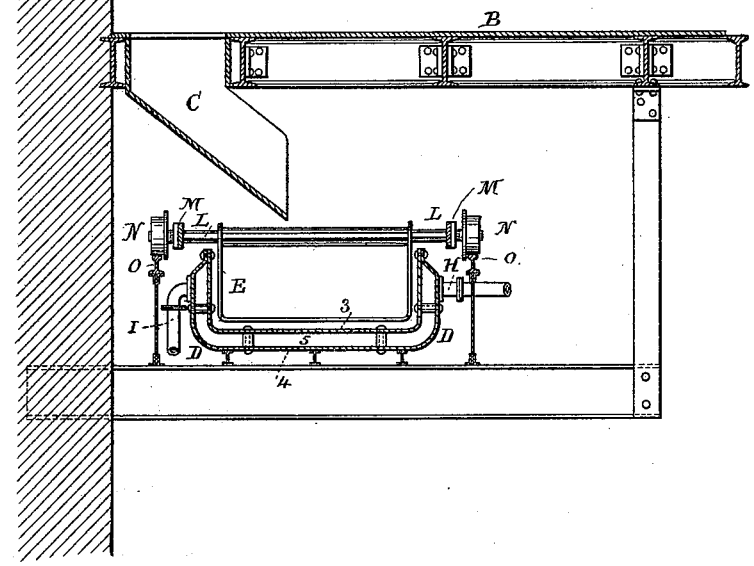
Figure 2:
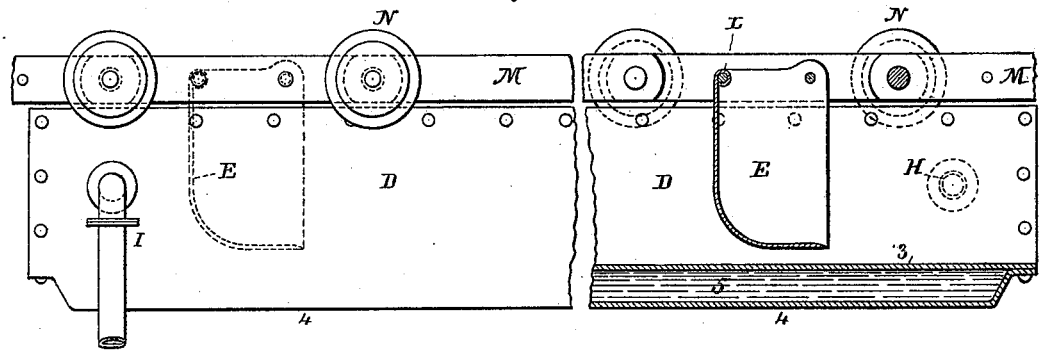

In the drawings, Figure 1 is a cross-section of the conveyer-trough and of the supplying hopper or chute; and Fig. 2 in an elevation, partially in section, of such conveyer-trough in larger size.

A represents the mouth or end of the retort or opening from which the heated mineral substances are drawn or discharged; B, the floor or platform for the workmen, in which is an opening for the heated materials to fall down as they are raked out from the retort, and C is a chute or hopper that directs the heated material to the conveyer-trough D, which trough is preferably suspended from the under side of the platform B in any usual or desired manner, and there are scrapers or conveyers E that are drawn along through the conveyer-trough to carry the heated material to a point of delivery. These conveyer-scrapers E are connected to the cross-bars L of the chains M, having rollers N running on tracks o outside the edges of the trough.

The trough D is made double, the inner plate or lining 3 is of the proper size for the reception of the material and for the scrapers E to act within the trough, and the outer plate or exterior 4 of the trough is at a sufficient distance from the interior portion 3 of the trough to leave the water space or chamber 5, and the edges of the plates 3 and 4 are permanently connected together, and it is generally advantageous to make use of stay-bolts or rivets at suitable distances apart to connect the inner and outer plates 3 and 4 permanently together. The conveyer-trough is to be of any desired size cross-sectionally and of the necessary length for the range of retorts or furnaces from which the heated materials are to be received, and this conveyer-trough is to terminate at any suitable point of delivery, and water is supplied to the trough, preferably, near the delivery end by a suitable pipe or coupling at H; and the water is allowed to escape at or near the opposite end of the trough by a suitable pipe or coupling I. Hence it will be apparent that as the heated materials are dumped from time to time into the conveyer-trough from the hopper or chute C and are moved along toward the delivery end such mineral substances are cooled by direct contact with the interior surface of the conveyer-trough that is kept cool by the water circulating through the chamber or space 5, and hence such heated materials are cooled to a greater or less extent before they reach the point of delivery, and at the same time the sheet-iron of the trough is protected from being burned out by the water that is in contact with the exterior of the trough 3, and the water itself does not come into contact with the heated materials which with some kinds of mineral substances would be detrimental.

I do not claim either of the separate devices herein made use of.

I claim as my invention—

1. The combination, with the tracks, of chains and supporting-rollers upon the tracks, a conveyer-scraper connected with the chains, and a trough with an interior and exterior of sheet metal and an intermediate water-space and supply and discharge water connections, substantially as specified.

2. The combination, with the tracks *o*, rollers N, chains M, and conveyer-scrapers E, of the trough D, composed of sheets of metal riveted together at the edges with an intermediate water-space, and the supply and discharge water pipes connecting with such space, substantially as specified.

Signed by me this 2d day of January, 1890.

CHAS. W. HUNT.

Witnesses:
GEO. T. PINCKNEY,
WILLIAM G. MOTT.